(12) United States Patent
Chan et al.

(10) Patent No.: US 10,281,589 B2
(45) Date of Patent: May 7, 2019

(54) DYNAMIC GPS LOCATION UPDATE

(71) Applicant: International Business Machines Corporation, Armonk, NY (US)

(72) Inventors: Yuk L. Chan, Rochester, NY (US); Heidi Lagares-Greenblatt, Jefferson Hills, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 15/250,348

(22) Filed: Aug. 29, 2016

(65) Prior Publication Data

US 2018/0059254 A1    Mar. 1, 2018

(51) Int. Cl.
*G01S 19/46* (2010.01)
*H04W 4/029* (2018.01)
*H04W 4/02* (2018.01)
*H04W 52/02* (2009.01)
*H04W 4/021* (2018.01)

(52) U.S. Cl.
CPC ............. *G01S 19/46* (2013.01); *H04W 4/023* (2013.01); *H04W 4/027* (2013.01); *H04W 4/029* (2018.02); *H04W 52/0254* (2013.01); *H04W 4/022* (2013.01); *H04W 52/0258* (2013.01); *Y02D 70/00* (2018.01); *Y02D 70/10* (2018.01); *Y02D 70/164* (2018.01)

(58) Field of Classification Search
None
See application file for complete search history.

(56) References Cited

U.S. PATENT DOCUMENTS

| 8,521,193 | B2 | 8/2013 | Paek et al. |
| 8,700,060 | B2 | 4/2014 | Huang |
| 9,008,735 | B2 | 4/2015 | Annavaram et al. |
| 9,215,560 | B1 | 12/2015 | Jernigan |
| 2014/0057667 | A1* | 2/2014 | Blankenship ......... H04L 67/303 455/500 |
| 2017/0034688 | A1* | 2/2017 | Kim ...................... H04W 76/14 |
| 2018/0098299 | A1* | 4/2018 | Chae ........................ H04J 11/00 |

FOREIGN PATENT DOCUMENTS

WO    2011109860 A1    9/2011

OTHER PUBLICATIONS

List of IBM Patents or Patent Applications Treated as Related; (Appendix P), Filed Aug. 29, 2016; 2 pages.
Yuk L. Chan et al., "Dynamic GPS Location Update", U.S. Appl. No. 15/250,317, filed Aug. 29, 2016.

(Continued)

*Primary Examiner* — Harry K Liu
(74) *Attorney, Agent, or Firm* — Cantor Colburn LLP; William Kinnaman

(57) ABSTRACT

A global positioning system (GPS) is provided and includes a processing system that is in communication with a network and memory. The memory has executable instructions stored thereon, which, when executed, cause the processing system to control the network to coarsely identify a region currently occupied by a tracked device and determine an accurate location of the tracked device responsive to a predefined event.

6 Claims, 9 Drawing Sheets

(56) References Cited

OTHER PUBLICATIONS

List of IBM Patents or Patent Applications Treated as Related; (Appendix P), Filed Feb. 8, 2017; 2 pages.
Yuk L. Chan et al., "Dynamic GPS Location Update ", U.S. Appl. No. 15/427,822, filed Feb. 8, 2017.
Yuk L. Chan et al., "Dynamic GPS Location Update ", U.S. Appl. No. 15/427,881, filed Feb. 8, 2017.

* cited by examiner

DYNAMIC GPS LOCATION UPDATE

BACKGROUND

The present invention relates to a global positioning system (GPS) and a method of GPS operation and, more specifically, to a method of dynamic GPS location updating using a coarse grain grid.

The GPS is a satellite-based navigation system made up of a network of satellites placed into earth orbit. The GPS was originally intended for military applications but in the 1980s it was made available for civilian use. The GPS works in any weather conditions, anywhere in the world, 24 hours a day. The satellites circle the earth twice a day in a very precise orbit and transmit signal information to earth where receivers take this information and use trilateration to calculate a user's exact location. Essentially, the receivers compare the time a signal was transmitted by a satellite with the time it was received. The time difference tells the GPS receiver how far away the satellite is from the GPS receiver. Now, with distance measurements from additional satellites, the receivers can determine the user's position and display it on an electronic map. In operation, a receiver must be locked on to the signal of at least 3 satellites to calculate a 2-D position (latitude and longitude) and track movement. With four or more satellites in view, the receiver can determine the user's 3-D position (latitude, longitude, and altitude). Once the user's position has been determined, other information, such as speed of the user's movements, bearing, track, trip distance, distance to destination, sunrise and sunset time and more can be calculated.

In current applications, users often access GPS location information by way of a battery powered mobile devices, such as a smartphone or a tablet. Such use of GPS location capabilities on mobile devices represents a significant drain on battery power and thus often exhibits a trade-off between accuracy or update frequency and battery power. For example, in the Android™ API, GPS applications provide the user with an option to specify the frequency of updates (e.g., updates every 5 seconds) or to specify updates by distance (e.g., update every 10 feet).

SUMMARY

According to an embodiment of the present invention, a global positioning system (GPS) is provided and includes a processing system that is in communication with a network and memory. The memory has executable instructions stored thereon, which, when executed, cause the processing system to control the network to coarsely identify a region currently occupied by a tracked device and determine an accurate location of the tracked device responsive to a predefined event.

According to another embodiment, a method of operating a global positioning system (GPS) application installed on a tracking device is provided. The method includes defining a dynamic region centered at a tracked device, setting an update time at a time required for the tracked device to reach a border of the dynamic region, geo-locating the tracked device at an expiration of the update time and repeating the defining, the setting and the geo-locating.

According to another embodiment, a method of operating a global positioning system (GPS) is provided and includes defining a dynamic region centered at a tracked device, setting an update time, geo-locating the tracked device at an expiration of the update time and repeating the defining, the setting and the geo-locating.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a GPS application is provided that offers accurate geo-location capabilities with minimized battery usage.

In one "static grid" case, the GPS application will divide an area of interest, such as an area associated with a map of a city or the world, into regions. A device will be associated with at least one of these regions and a next GPS update will be set to the shortest time the user needs to leave the region. When the GPS application is used to determine an accurate location within a given region, the device associated with the region will request an accurate GPS update and then communicate with the GPS application such that the accurate location can be calculated. In another "dynamic grid" case, the GPS application creates regions centered at users' current locations where the regions have dynamic sizes based on the users' speed and bearing. The next GPS updates will be set in accordance with the shortest times the users need to leave the respective regions. When the GPS application is used to determine an accurate location, the GPS application will find a list of devices within the corresponding user's current region and will request location information from those devices. In another "hybrid" case, static and dynamic grid regions are created.

Figure 1:
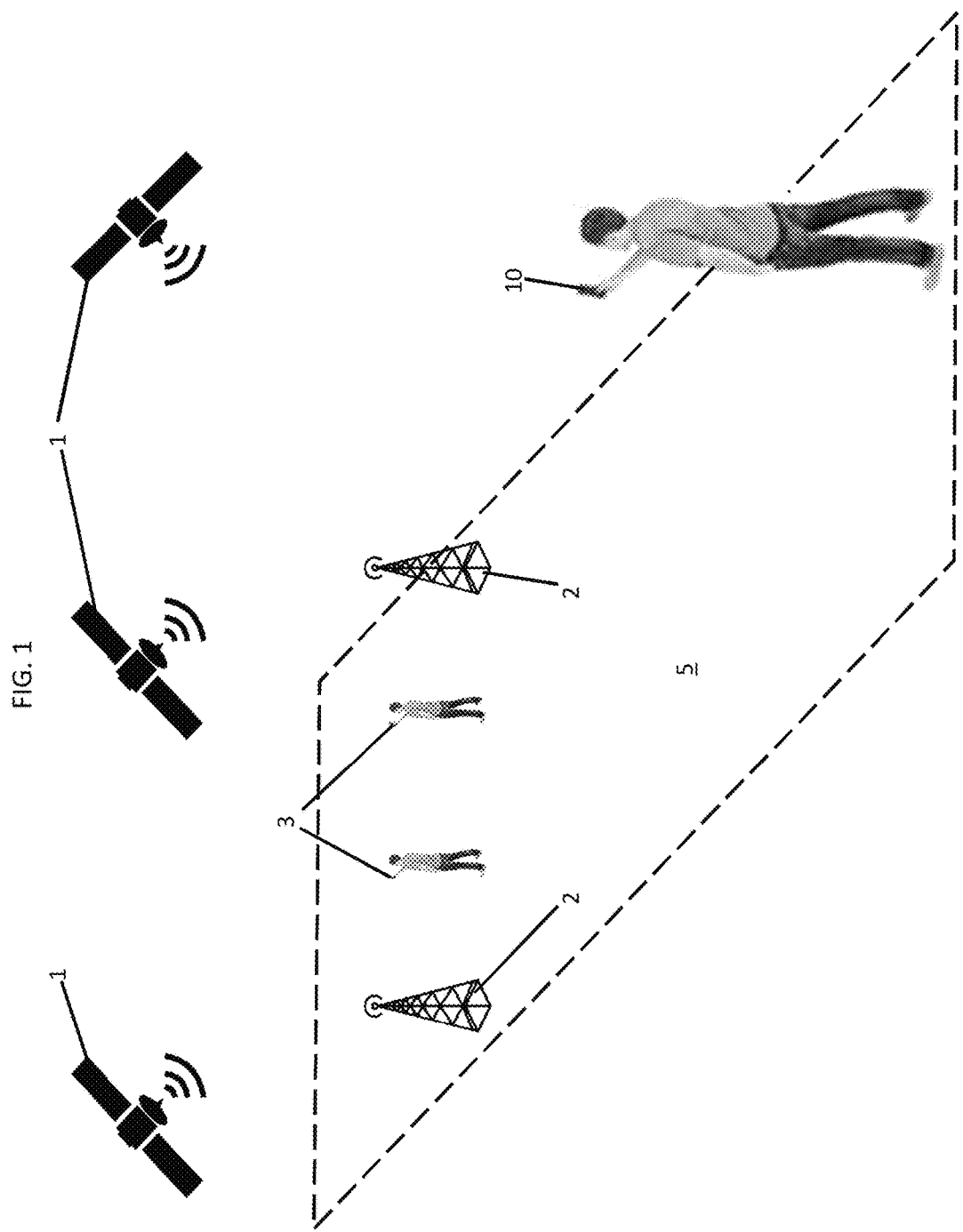
FIG. 1 is a schematic perspective illustration of a user and a global positioning system (GPS) in accordance with embodiments.
Figure 2:
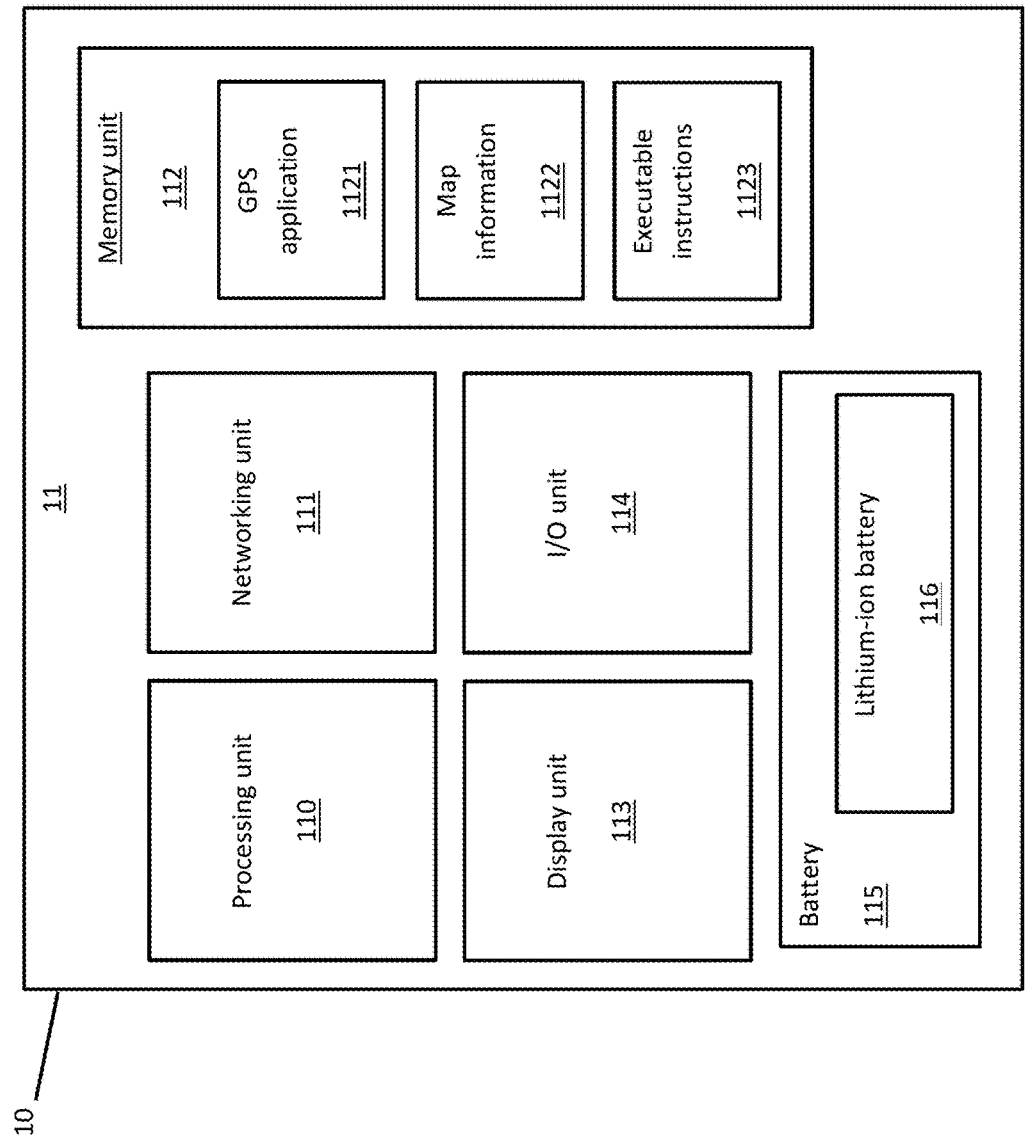
FIG. 2 is a schematic illustration of a device on which a GPS application is installed and executable.
Figure 3:
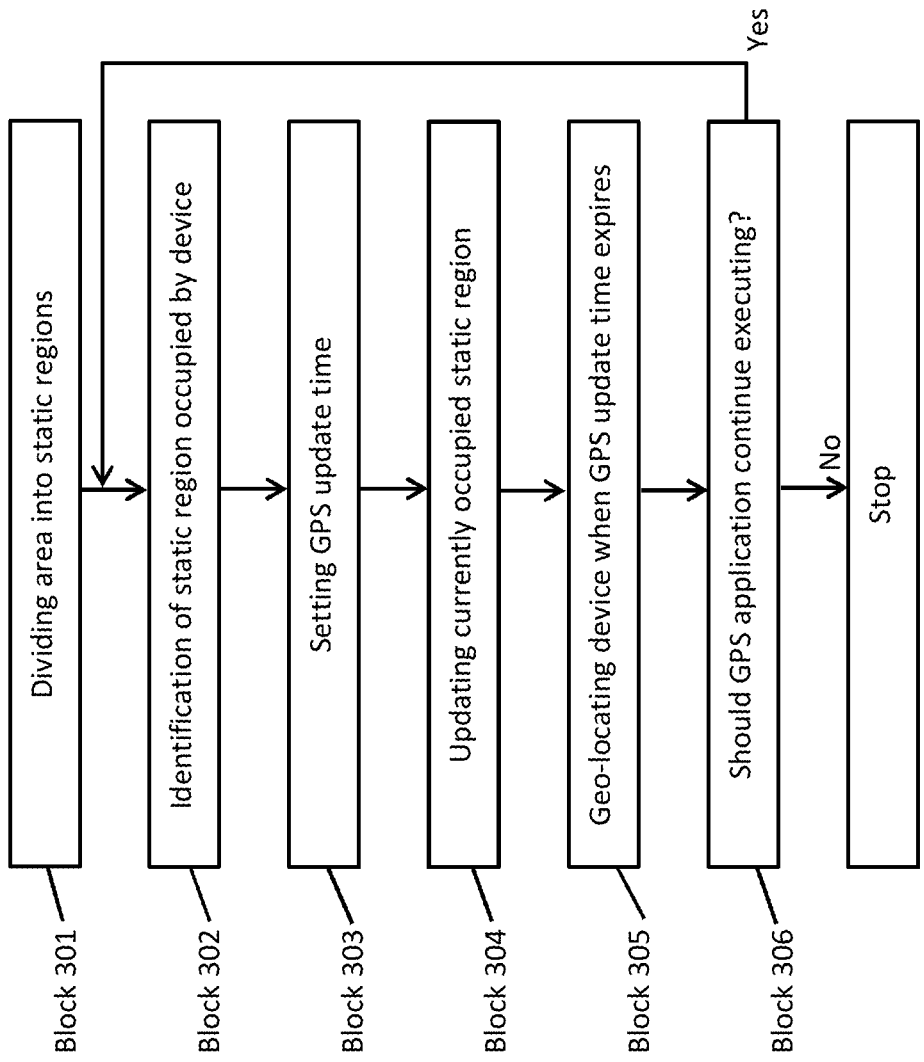
FIG. 3 is a flow diagram illustrating a method of operating a GPS application installed on a device in accordance with embodiments.

With reference to FIGS. 1 and 2, a tracking or tracked device 10 (hereinafter referred to as a "device 10") or system that is capable executing a global positioning system (GPS)

application is provided. For the purpose of clarity and brevity, the following description will generally relate to the device 10 but it will be understood that the device 10 could be used or referred to interchangeably with the system.

The GPS application provides for connections between the device 10 and a plurality of satellites 1 of a globally deployed GPS as well as other fixed devices 2 and portable devices 3 that are or may be deployed throughout a given space 5. The device 10 may be configured as a portable computing device 11, such as a smartphone, a tablet or a laptop computer, and includes a processing unit 110, a networking unit 111, a memory unit 112, a display unit 113, an input/output (I/O) unit 114 and a battery 115. The processing unit 110 may include a central processing unit, such as an integrated circuit (IC), and the networking unit 111 may include an antenna and/or other components by which the processing unit 110 is communicative with the satellites 1, the fixed devices 2 and the portable devices 3 (e.g., local or non-local, region-associated or non-associated portable devices 3 as explained below). The display unit 113 may be provided as a monitor or a touchscreen by which information is displayed to a user and the I/O unit 114 may include the touchscreen as well as a displayable keyboard and a trackpad. The battery 115 is configured to provide a limited amount of power to drive respective operations of the processing unit 110, the networking unit 111, the memory unit 112, the display unit 113 and the I/O unit 114.

In accordance with embodiments, the battery 115 may include a rechargeable, lithium-ion battery 116 with the device 10 being operable while plugged in or unplugged. In the former case, the battery 115 effectively has an unlimited charge to power the various components of the device 10. However, when the battery 115 is unplugged, the battery 115 only has the limited amount of power available to drive the respective operations of the processing unit 110, the networking unit 111, the memory unit 112, the display unit 113 and the I/O unit 114. Thus, since the execution of the GPS application will often occur with the device 10 being unplugged, the execution of the GPS application will allow for accurate geo-location of the device 10 in a manner that allows the user of the device 10 to preserve charge and lengthen battery 115 life.

In particular, it will be understood that the memory unit 112 has the GPS application 1121 stored thereon along with map information 1122 and executable instructions 1123 for executing the GPS application 1121. When executed, the executable instructions cause the processing unit 110 to periodically and coarsely identify a static, dynamic or static with a superimposed dynamic region currently occupied by the device 10 or another device and to periodically determine an accurate location of the device 10 or the other device within or outside of the identified region via the networking unit 111.

With reference to FIGS. 3-6, a method of operating the GPS application on the device 10 or another device, system or cloud computing environment is provided. The method includes dividing an area defined by the map information 1122 into static regions 30 that may be overlaid on the map information 1122 for interactive display to at least the user by way of the display unit 113 and the I/O unit 114 (block 301). The static regions 30 may be, but are not required to be, regularly shaped and contiguous. For example, the static regions 30 may be rectangular or square and may abut with one another directly. The dimensions, sizes, and shapes of the static regions 30 may be stored locally in the memory unit 112 with the map information 1122 or remotely from the device 10 (e.g., in the cloud computing environment). The method further includes an initial coarse identification of which static region 30 is currently occupied by the device 10 or another device (hereinafter the device 10 will be understood to refer to the device 10 itself or the other device) as well an optional initial coarse identification of the static regions 30 that are currently occupied by the fixed devices 2 and the portable devices 3 and a more accurate geo-location of the device 10 and optionally the fixed device 2 and the portable devices 3 (block 302).

Figure 4:
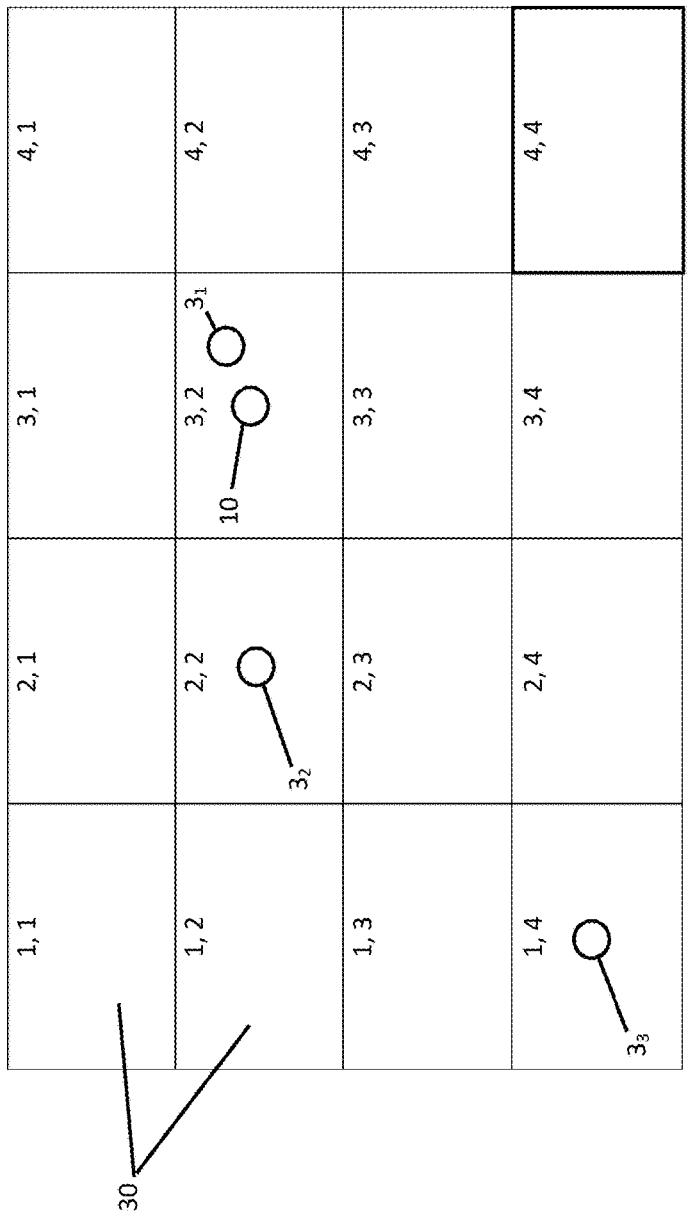
FIG. 4 is an illustration of static regions defined by the GPS application of FIG. 3.
Figure 5:
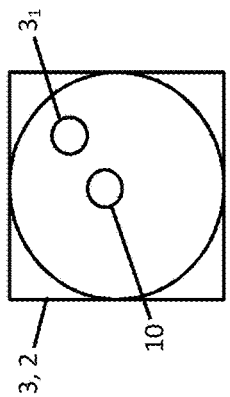
FIG. 5 is an illustration of one of the static regions that is currently occupied by a device on which the GPS application is installed.

Thus, as shown in FIG. 4, the method may begin by determining that the device 10 is located at some position within region 3, 2, that the first portable device $3_1$ is located at some position within region 3, 2, that the second portable device $3_2$ is located at some position within region 2, 2 and that the third portable device $3_3$ is located at some position within region 1, 4. In addition, as shown in FIG. 5, the method may begin by also determining that the device 10 is located proximate to the center of region 3, 2 and that the first portable device $3_1$ is located toward the side of region 3, 2.

The method further includes setting a GPS update time at a time required for the device 10 to reach a border of the currently occupied static region 30 (block 303) and updating the currently occupied static region in an event the device 10 crosses a static region border (block 304). Here, it may be assumed that the device 10 is being carried by the user and that the user is either standing still or, more likely, moving. In the latter case, the time can be calculated by considering the user's current speed and vector or bearing, the user's current transportation type (e.g., walking, biking, riding in a car, etc.), the user's historical speed for the user's current activity and local speed limits. Thus, if the user is walking with the device 10, GPS update time will be set as the distance between the user and the border of the region 3, 2 divided by the speed the user is walking. On the other hand, if the user is biking with the device, the GPS update time will be set as the distance between the user and the border of the region 3, 2 divided by a combination of the speed the user is biking, the user's historical biking speed and local speed limits for bikers.

Depending on the settings of the GPS application and the accuracy required to determine whether a user is within a given region 30, the GPS application can choose to use the shortest time or a moderate time required for the device 10 to get to the border. For example, if a user is walking, we can estimate the GPS update time by assuming user has and might switch to other faster forms of transportation, such as biking or driving.

The initial coarse identification of the static region 30 in which the device 10 is located and the initial identification of the accurate location of the device 10 within the static region 30 may be stored locally within the memory unit 112 of the device 10 or remotely from the device 10 (e.g., in the cloud computing environment). Similarly, an update in the static region 30 currently occupied by the device 10 may be recorded locally within the memory unit 112 or remotely from the device 10. This can be true as well for the first, second and third portable devices $3_1$, $3_2$ and $3_3$ whereby their current and updated locations within regions 30 are stored either within the memory unit 112 or remotely from the device 10 in such a way as to be accessible to the device 10.

In accordance with embodiments, the GPS update time will be set as the shortest time that could be required for the device 10 to reach the border. That is, if the user is biking and the user's historical biking speed is less than the local speed limits, the GPS update time may be set as the distance between the user and the border of the region 3, 2 divided by the local speed limits for bikers. As another example, we could assume the user might go 30% above the speed limit for the GPS update time estimation.

In any case, once the GPS update time expires, the method further includes geo-locating of the device 10 (block 305). Such geo-location of the device 10 may be accomplished by way of communications between the networking unit 111 and the plurality of satellites 1, the fixed devices 2 and the portable devices 3. More particularly, if the device 10 remains in the region 3, 2, the geo-location of the device 10 within region 3, 2 may be determined by way of communications between the networking unit 111 and three or more of the plurality of satellites 1, between the networking unit 111 and another device such as the first portable device $3_1$, which could be locally associated with the region 3, 2, or between the networking unit 111 and a fixed or portable device remote from the region 3, 2. Alternatively, if the device 10 crosses the border between region 3, 2 and region 2, 2, the geo-location of the device 10 within region 2, 2 may be accomplished by way of communications between the networking unit 111 and three or more of the plurality of satellites 1 or between the networking unit 111 and the second portable device $3_2$ which could be locally associated with the region 2, 2.

Once the geo-locating of the device 10 is complete, the method may further include a determination as to whether the application is needed to continue executing (block 306). If not, the method ends. If so, the method continues by repeating the static region identification of block 302, the setting of the GPS update time of block 303, the updating of the currently occupied static region of block 304 and the geo-locating of block 305.

Figure 6:
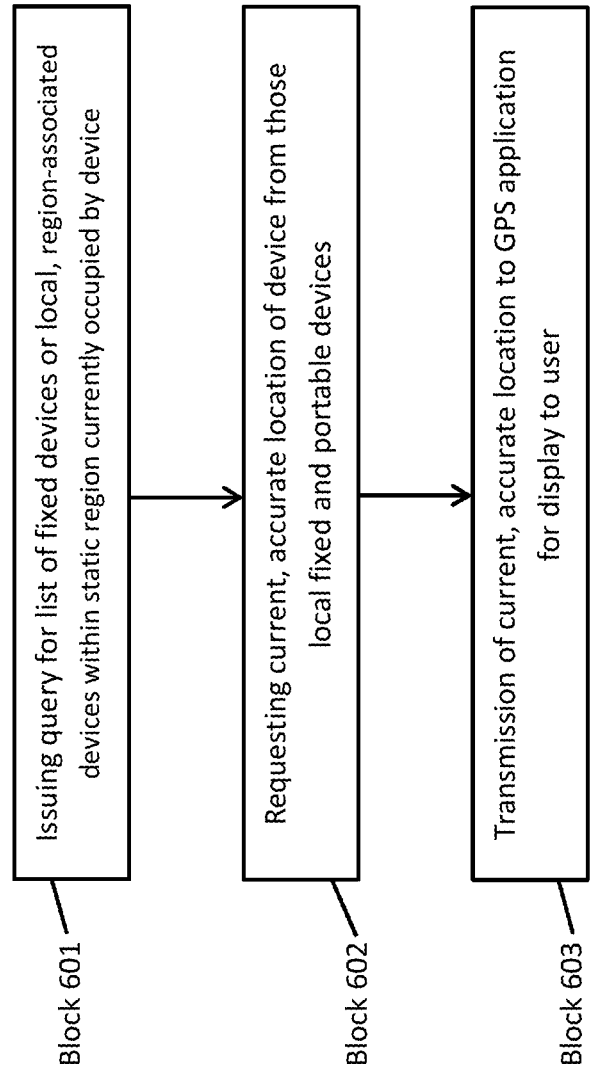
FIG. 6 is a flow diagram illustrating a method of geo-locating a device using the GPS application in accordance with embodiments.
Figure 7:
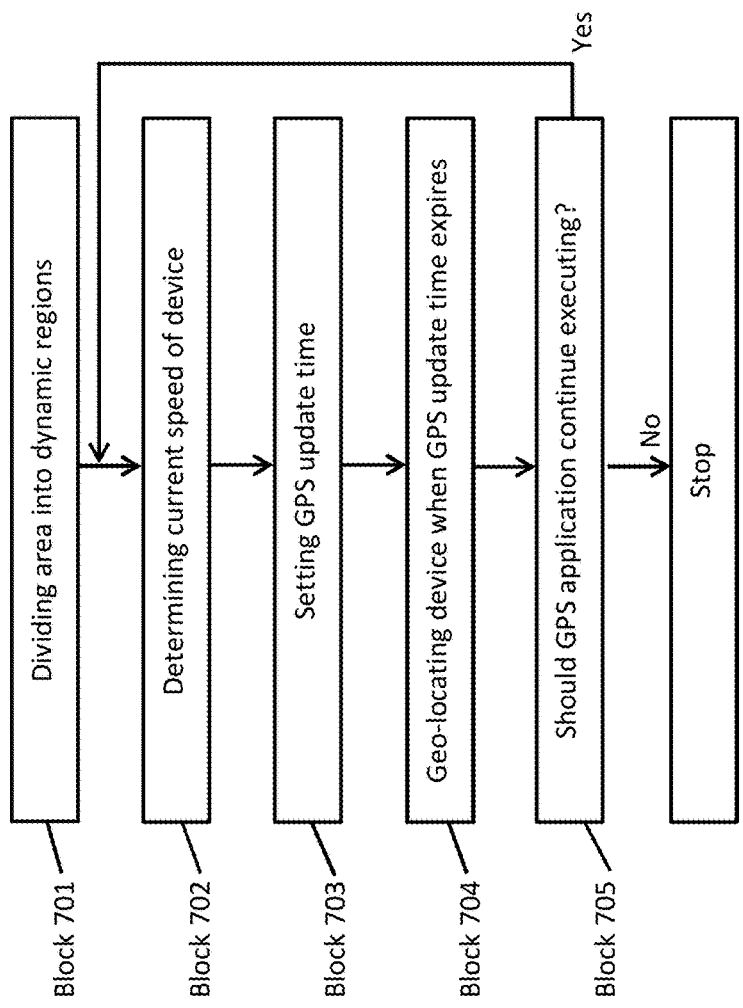
FIG. 7 is a flow diagram illustrating a method of operating a GPS application installed on a device in accordance with alternative embodiments.

The geo-locating of block 305 may include querying at least one of the satellites 1, the fixed devices 2 if any within the currently occupied static region 30 and any local, region-associated devices (i.e., the first portable device $3_1$ with the device 10 in region 3, 2). In accordance with embodiments and, as shown in FIG. 6, the geo-locating of block 305 may include issuing a query for a list of the fixed devices 2 or the local, region-associated devices within the static region 30 that is currently occupied by the device 10 (block 601), which could for example return a list including the device 10 itself, requesting a current, accurate location of the device 10 from the at least one of the satellites 1 and/or those local fixed and portable devices (block 602) and a transmission of the current, accurate location to the GPS application for display to the user (block 603).

In accordance with alternative embodiments and, with reference to FIGS. 7-10, another method of operating the GPS application on the device 10 will be described. In these cases, the method includes defining a dynamic region 40 that is centered at the device 10 (block 701), determining a current speed of the transportation of the device 10 (block 702), setting the GPS update time at a time required for the device 10 to reach a border of the dynamic region 40 at the current speed, at another historical or at local speed limits (block 703), geo-locating the device 10 at an expiration of the GPS update time (block 704) and optionally repeating the defining of the dynamic region of block 701, the determining of the speed of block 702, the setting of the GPS update time of block 703 and the geo-locating of block 704 based on a determination of whether the execution of the GPS application is to continue or not (block 705).

The definition of the dynamic region 40 of block 701 may be conducted by determining a type of transportation of the device 10, a speed of the transportation of the device 10, a historical speed and local speed limits given the transportation type. In any case, the dynamic region 40 may be generally circular with the assumption that the speed of the transportation of the device 10 would be relatively uniform in all directions and, in accordance with embodiments, the setting of the GPS update time of block 702 may include setting a shortest time required for the device 10 to reach the border at the transportation speed or the local speed limits. Thus, once again, if a biker is biking at a given speed, the setting of the GPS update time of block 702 may include setting the time required for the device 10 to reach the border of the dynamic region 40 as the radius of the dynamic region divided by the local speed limits.

Figure 8:
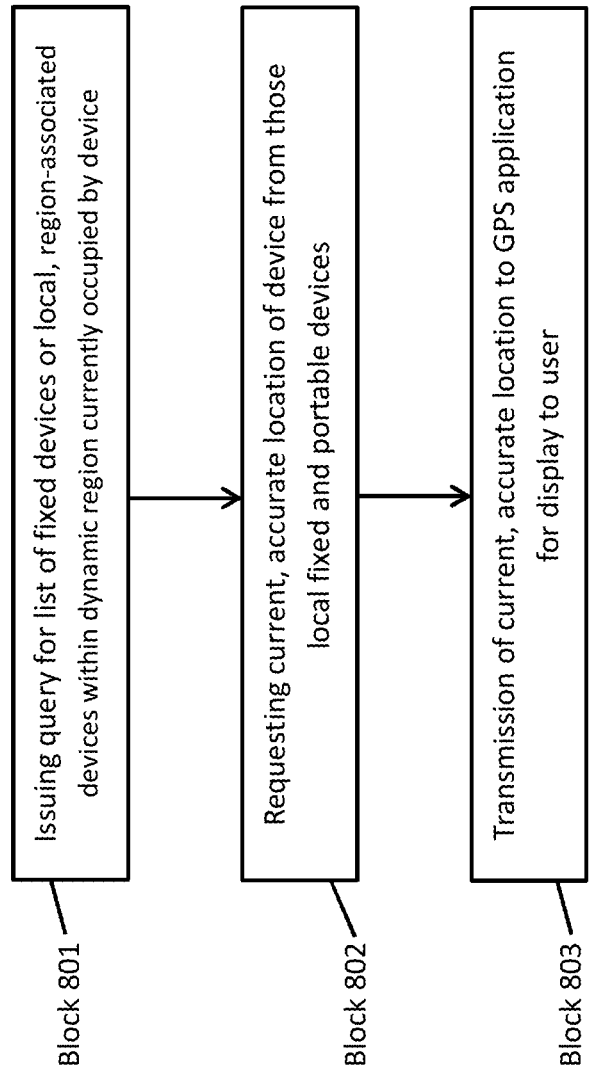
FIG. 8 is a flow diagram illustrating a method of geo-locating a device using the GPS application in accordance with embodiments.

The geo-locating of block 704 may include querying at least one of the satellites 1, the fixed devices 2 if any within the currently occupied static region 30 and any local, region-associated devices. In accordance with embodiments and, as shown in FIG. 8, the geo-locating of block 704 may include issuing a query for a list of the fixed devices 2 or the local, region-associated devices within the dynamic region 40 that is currently occupied by the device 10 (block 801), requesting a current, accurate location of the device 10 from the at least one of the satellites 1 and/or those local fixed and portable devices (block 802) and a transmission of the current, accurate location to the GPS application for display to the user (block 803).

In accordance with further embodiments, the definition of the dynamic region 40 of block 701 may further include a determination of the user's ultimate destination and a subsequent definition of the dynamic region 40 such that the border of the dynamic region 40 is reached before the ultimate destination.

The system and methods described herein can be applicable in a number of fields and technologies including, but not limited to, dating websites where a user is looking for someone nearby with similar interests and location dependent alerts, such as advertisements or traffic accident alerts. Still other applications could be taxi or Uber™ type services. In the latter example, with reference to FIG. 9, it will be understood that the system and methods described herein need not be limited in operation to cases in which the device 10 is moving. Rather, the system and methods could be similarly applied to gauge distance and location of another device that is monitored by the user's device 10 as long as the other device is running the GPS application.

Figure 9:
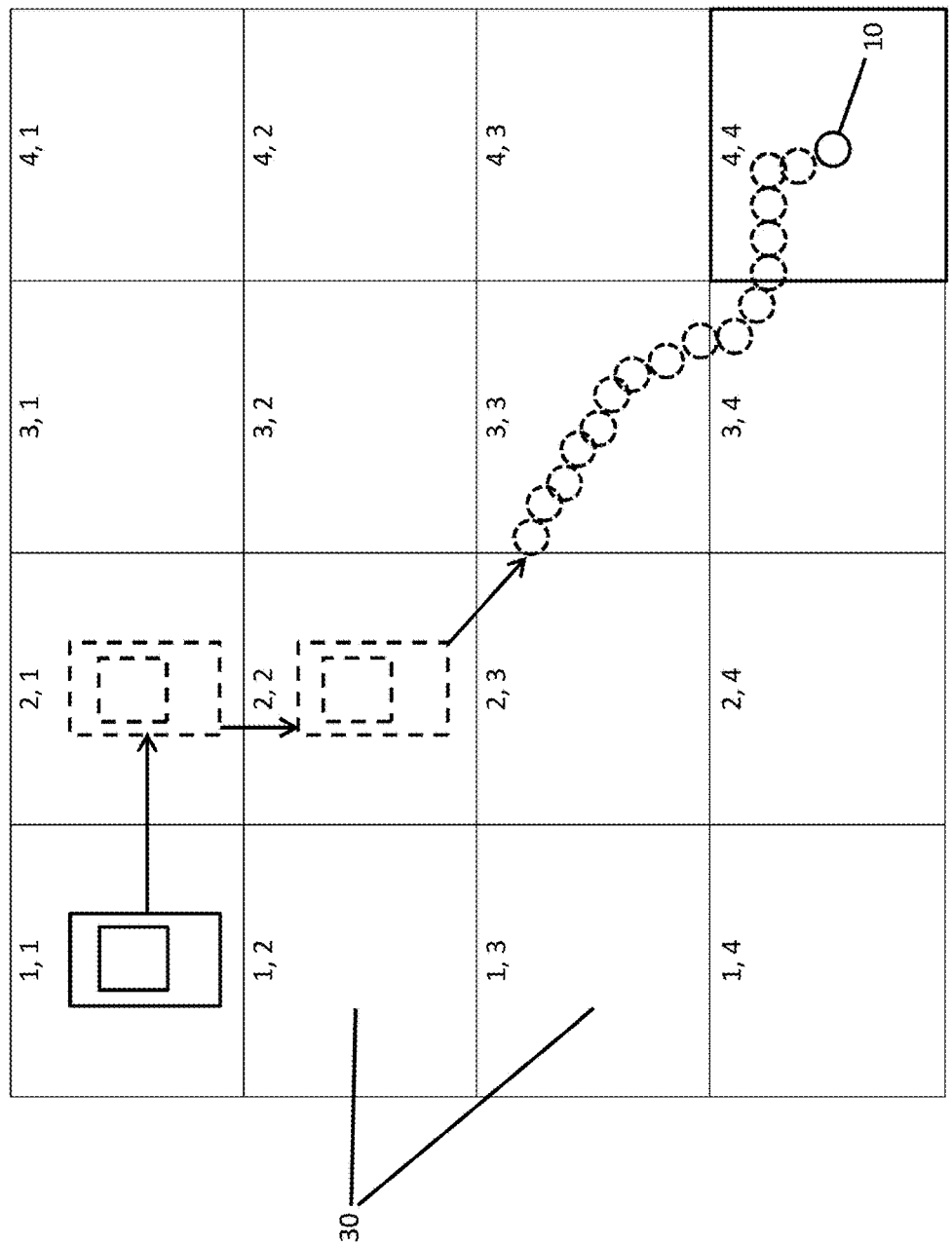
FIG. 9 is a graphical depiction of an operation of the GPS application in accordance with embodiments.

As shown in FIG. 9, if a user is located at static region 4, 4 and calls for a taxi that is carrying a device connected to the GPS application via the cloud and which is currently located at static region 1, 1. In this case, the display unit 113 of the user's device 10 may illustrate the taxi's location as being merely within static region 1, 1 with the processing unit 110 executing the methods as set forth above. That is, the processing unit 110 sets the GPS update time at a time required for the taxi to reach a border of the currently occupied static region 1, 1, updates the currently occupied static region 1, 1 to the next static region 1, 2 in an event the device crosses a static region border and geo-locates the taxi at the expiration of the GPS update time. The display unit 113 of the user's device 10 does not require refreshing of the taxi location, or retrieving of the most recent taxi location through a communication network until the expiration of GPS update time. The processing unit 110 then repeats the process at least until the taxi gets near the user of the device 10 at which point the display unit 113 may begin to illustrate the taxi's real-time accurate location. In this way, at least while the taxi is remote from the user of the device 10 (e.g., within regions 1, 1, 1, 2, and 2, 2), drains the battery power of the device 10 due to communication with other devices and highly detailed graphics illustrating the real-time accurate location of the taxi are limited or reduced to thereby conserve battery power.

Figure 10:
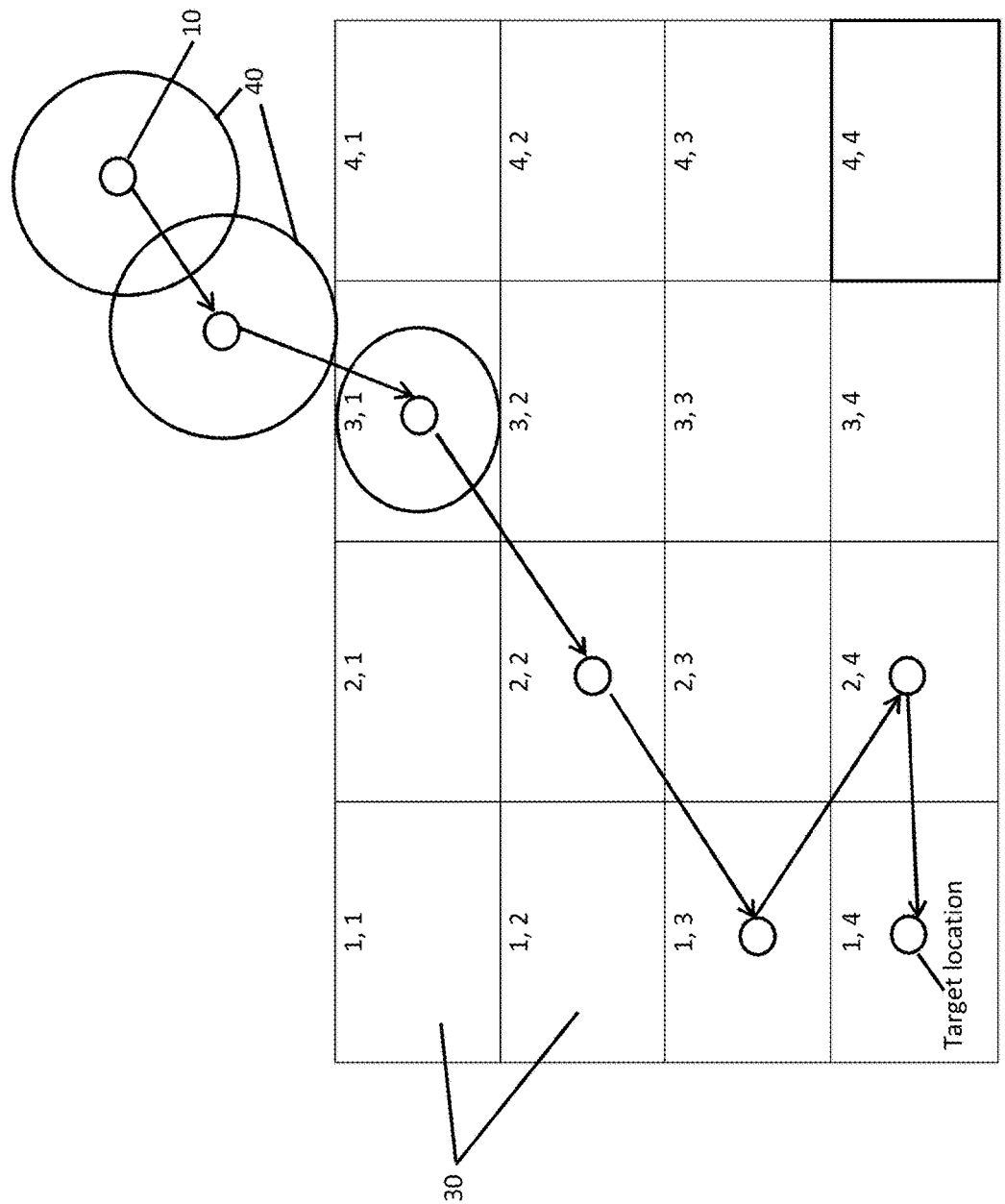
FIG. 10 is a graphical depiction of an operation of the GPS application in accordance with embodiments.

With reference to FIG. 10 and, in accordance with further embodiments, the system and method described above may be provided for a hybridized operation in which the dynamic region 40 is at least initially used to track the location of the device 10 but is eventually superimposed on one or more static regions 30 and then potentially replaced by the static regions 30 as the device 10 approaches a given location within one of the static regions 30. That is, as shown in FIG. 10, the device 10 may initially be located within a region that does not correspond to the map information 1122 and is thus not located within any of the static regions 30. In such a case, the dynamic region 40 is defined and maintained until the device 10 reaches one of the static regions 30. At this point, the dynamic region 40 may be superimposed over one or more of the static regions 30 and may be ultimately discarded in favor of the static regions 30 as the device approaches the target location.

In accordance with further embodiments, the lookup of devices at a static region 30 or a dynamic region 40 that is of interest can be accomplished by first looking up one or more static regions 30 or dynamic regions 40 where the region of interest is or may be located. The region of interest could be a specific geo-location or an area defined by multiple geo-locations. Once the static regions 30 or dynamic regions 40 are determined, a more accurate geo-location of the various fixed and portable devices within the static regions 30 or dynamic regions 40 can be requested. The accurate device location can then be used to determine a list of devices within the region of interest while the devices that had an updated geo-location can redefine the static regions 30 or the dynamic regions 40.

As a non-limiting example, consider a traffic accident involving a tractor or trailer that happens at a given geo-location with the police looking for doctors and tow trucks within close proximity for help. In such a case, the GPS application can first look for devices (such as smart phones) of doctors and tow trucks within, say, a two mile radius of the accident. This is further accomplished by looking for the one or more static regions 30 or the dynamic regions 40 overlapped with the 2 miles radius. Then, a list of devices belonging to doctors and tow trucks within the static regions 30 or the dynamic regions 40 can be determined. This list of devices can be further filtered based on historical or other information, for example, as when a doctor was contacted in the past, he answered 5% of phone calls, a family doctor versus an emergency room doctor can trigger a different prioritization or a tow truck that's capable of towing only sedans can be removed.

The accurate geo-location of the remaining devices can then be requested and the time required for the users of the devices to reach the accident scene can also be determined. In particular, the user of the device with the shortest time to the accident scene can be contacted for help. With this approach, the geo-location of the devices belonging to the doctor doesn't require continuous geo-location updates and indeed only requires coarse grain updates. Based on the static regions 30 and the dynamic regions 40, only the doctors within the regions will need the more accurate geo-location and require a single time GPS update.

In accordance with further embodiments, the static regions 30 or the dynamic regions 40 that each device is located in can be stored in a database of the cloud computing environment. During the expiration of the GPS update time, the device can determine its GPS location through methods described earlier and then send the GPS location information to the database of the cloud computing environment. A processor of the cloud computing environment could then determine a static region 30 in which the device sits or assign a dynamic region 40 to the device and determine the next GPS update time. This static region 30 or dynamic region 40 and the GPS update time will be communicated to the device. The device will use the GPS update time and repeat the process described above.

In a similar example as above, when devices within a two mile radius of a geo-location is needed, the database of the cloud computing environment will be used to determine a list of devices within the static region 30 or the dynamic regions 40 overlapping the two miles radius. Only the devices that satisfy the criteria will be contacted for accurate geo-location. This approach uses the cloud computing environment to store the coarse grain location and allows the first step of device lookup to use resources from the cloud computing environment, which has virtually unlimited resources and battery power. This approach thus requires minimal battery consumption and communication requirements will entice and allow more users to register for these type of services.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A global positioning system (GPS), comprising:
a GPS device, comprising:
a display unit
a processing system that is in communication with a communications network and memory,
the memory having executable instructions stored thereon, which, when executed, cause the processing system to control the display unit and the network to:
divide an area defined by map information into regularly shaped and contiguous static regions which are overlaid onto the map information for display by the display unit
coarsely identify one of the static regions which is currently occupied by a tracked device;
determine an accurate location of the tracked device responsive to a predefined event within the identified one static region;
set a first update time at a shortest time required for the tracked device to reach a border of the identified one static region based on one or more of distance between the tracked device and the border, a type of transportation of the tracked device, a historical speed of the tracked device given the type of transportation and local speed limits; and
at an expiration of the first update time, repeat the coarse identification and the determination of the accurate location and set a second update time.

2. The GPS according to claim 1, further comprising a rechargeable battery.

3. The GPS according to claim 1, wherein the network is communicative with at least one of GPS satellites and local, region-associated devices.

4. The GPS according to claim 1, wherein the region is one of static and dynamic.

5. The GPS according to claim 1, wherein the region is static and has a dynamic region superimposed thereon.

6. The GPS according to claim 1, wherein the predefined event comprises at least one of an update time expiration and the device being proximate to a target.

* * * * *